May 7, 1963  D. M. MacMILLAN  3,088,171
MEANS FOR REMOVABLY INCORPORATING ELECTRICAL
HEATING ELEMENTS IN HEATER BODIES
Filed Dec. 6, 1954  2 Sheets-Sheet 1

INVENTOR.
DONALD M. MacMILLAN
BY
ATTORNEY

May 7, 1963  D. M. MacMILLAN  3,088,171
MEANS FOR REMOVABLY INCORPORATING ELECTRICAL
HEATING ELEMENTS IN HEATER BODIES
Filed Dec. 6, 1954  2 Sheets-Sheet 2

INVENTOR.
DONALD M. MacMILLAN
BY
ATTORNEY

United States Patent Office 3,088,171
Patented May 7, 1963

3,088,171
MEANS FOR REMOVABLY INCORPORATING ELECTRICAL HEATING ELEMENTS IN HEATER BODIES
Donald M. MacMillan, Macon, Ga.
Filed Dec. 6, 1954, Ser. No. 473,152
2 Claims. (Cl. 18—38)

The present invention relates to a means for removably incorporating an electrical heating element in a metal body to be heated thereby.

For a long period of time, electrical heating elements have been associated in various ways with metal bodies, that are heated thereby. For most effective heating of the metal body, it is desirable, in many instances for many reasons, to embed the heating element within the body such as by placing the same within the body at the time the body is cast or molded. When the heating element is so molded into the metal body and the heating element becomes defective or "burnt out," it is necessary to discard the entire metal body along with the heating element. This is quite expensive and undesirable when the metal body is in a form to have further utilitarian use or function for which it is particularly designed at considerable expense and effort such, for instance, as a molding matrix for rubber products, especially automobile tires, where the mold is otherwise usable and costly to produce.

The object of the invention, therefore, is to provide a means by which heated metal bodies, particularly tire matrix molds, may have intimately incorporated therein an electrical heating element that will efficiently heat the metal body and yet may be readily removed and replaced, should the heating element become defective.

The above object for the invention is accomplished broadly by providing a metal body, that is to be heated, and forming in one face of said body a depressed groove in the area of the body where it is desired to embed the heating element, said groove being of such depth or other dimensions as to receive an electrical heating element of a conventional type which, when arranged in the groove, will be located at the desired points of the body member; and, then, filling the groove with a molten metal or other heat-conducting material to intimately contact and bond the heating element and the walls of the groove to efficaciously transfer the heat from the heating element to the body member which itself acts as a heater. In performing this invention, the filler heat-conducting material must have a melting point higher than the operating temperatures of the heating body member, but no higher than the melting point of the material of said body, and preferably lower than the melting point of the material of said body member, so that it will remain effective and solidified during the operation of the heater and, should the heating element become defective, the heating element may be removed by melting the filler material, such as by a blowtorch, allowing the same to run from the groove and release the heating element, whereby the heating element may be replaced in the manner stated. In some instances the filler material may be driven around and out of the groove with hammer and chisel or by some machining process.

Other objects and novel features of the present application will be apparent from the following detailed description.

The invention will be understood best from the following description of the specific embodiments now actually used, and in which the method employed and the combination of parts and the detailed construction thereof are more fully described and pointed out in the appended claims.

The accompanying drawings, which by reference form part of this specification, show the preferred embodiments of the invention although it is to be understood that the showing herein is by way of example and is susceptible to many changes and modifications that fall within the present invention and the scope of the appended claims.

In the drawings—

Figure 1:
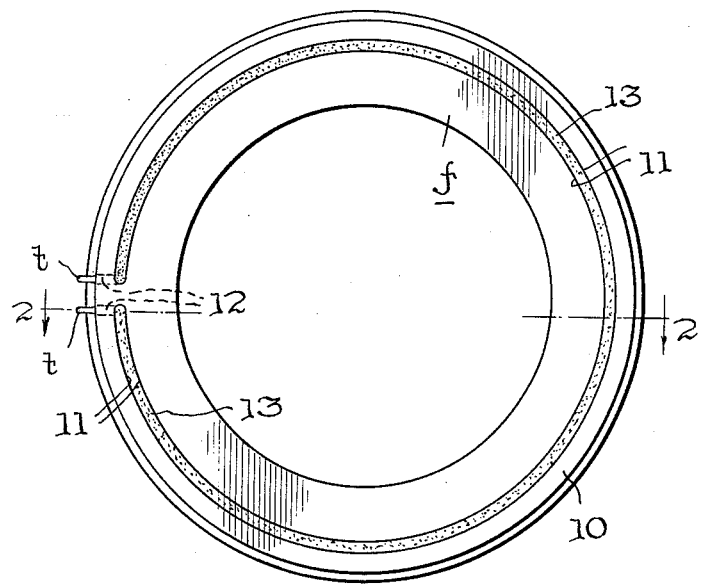
FIGURE 1 is a side view of a tire matrix mold section constructed in accordance with the present invention.
Figure 3:
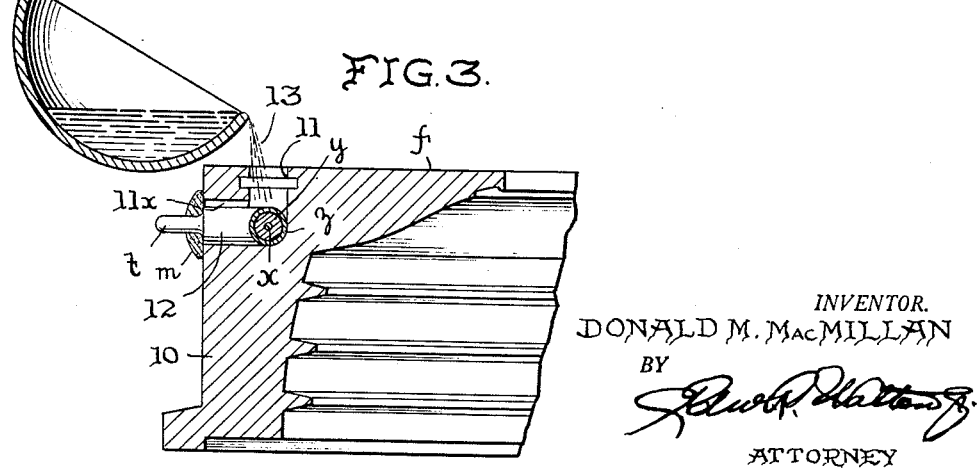
FIGURE 3 is a fragmentary sectional view of a tire matrix section in accordance with the present invention and illustrating the manner in which the heating element is removably embedded therein.

Referring specifically to the drawings, in which like characters indicate similar and like parts throughout the several views, and with particular reference to FIGURES 1 and 3, 10 denotes a matrix section of pneumatic tire molds and of the type usually employed in the recapping or retreading of automobile tires. In the more modern practice of retreading or recapping pneumatic vehicle tires, electrically-heated matrix sections are employed as it has been found that the heating of these mold sections can be more efficaciously accomplished and controlled within the vulcanization limits by electrical heating-elements. It has been found, also, that better heating of the tire mold, with less heat loss or with the expenditure of less heat, can be obtained by embedding the heating element in the tire mold itself.

Figure 2:
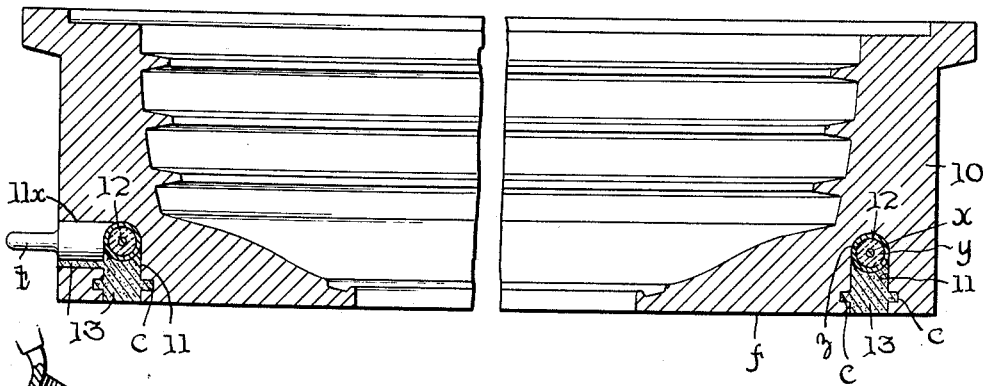
FIGURE 2 is a transverse section view of the matrix shown in FIGURE 1 and taken substantially on line 2—2 of FIGURE 1.

According to the present invention, the tire matrix 10 is provided with a groove 11 in one surface thereof which extends about the area of the mold where the heat is desired. Consequently, as shown in FIGURES 1 and 2, it is preferred to provide a circular groove 11 in an outer side face f of the matrix and of a width that will receive a conventional electrical heating-element 12 and of a depth that will permit said heating-element to lie in the bottom of the groove at a point that properly positions the heating-element to distribute the heat, emitted therefrom, throughout the tread forming area of the matrix section. The groove 11 may be cast or machined into the mold section, during the making thereof or subsequently after its making.

The electrical heating-element 12 may be of any conventional type, but it is preferred to employ heating-elements now commonly used and comprising an interior resistance element $x$ surrounded by a ceramic insulation and all encased or enveloped by a metallic shield or shell $z$ having an extremely high melting point. This type of heating-element may be tubular or cylindrical in form or may be of the flat ribbon type, according to preference, and are pre-shaped in their manufacture to the size and form in which they will be ultimately used.

As shown in FIGURE 3, the matrix section 10, provided with the groove 11, is placed upon a supporting surface with its outer side *f* uppermost. A heating element 12, in the form of a split ring, is then disposed in the circular groove 11 and permitted to rest upon the bottom of the groove with its terminal ends *t* projecting, preferably through lateral grooves 11ˣ, from the perimeter or circumferential surface of the mold for connection with a suitable source of electrical supply. The space between outer ends of the lateral grooves 11ˣ and the terminals may be temporarily closed by suitable mastic *m* placed against the adjacent outer surface of the matrix section 10. Then, a molten metal 13 is poured into the groove 11 to fill the same, which firmly embeds and secures the heating-element 12 in said groove and makes bonding heat-conducting-contact therewith and with the side walls of said groove. The filler metal 13 has a melting point higher than that of the temperatures at which the matrix will be subjected during vulcanizing operations but no higher than the melting point of the metal composing the matrix body 10. After the molten filler-material 13 has been poured into the groove 11 and allowed to harden, any unevenness may be ground flush with the surface *f*.

As an example of the present practice in connection with tire-molds, the matrix 10 is of foundry aluminum and has a melting point of about 1250° F. and the filling metal 13 is of any type which has a melting point higher than the operating temperatures for vulcanization of rubber, which is about 300° F. and may be of die-cast aluminum. In any event, however, the melting point of the filler metal 13 should be no higher than that of the material forming the matrix 10 so that it may be removed by heating with a blow-torch and allowed to run or flow from the groove, when it is desired to remove the heating element and to replace it with another.

It will be noted that, should the heating element become defective in any way, it may be replaced by the application of sufficient heat to the filler-material 13—such as by blow-torch—and, by properly positioning the matrix section, the filler material 13 will flow from the groove allowing the heating element to be removed and replaced.

Figure 4:
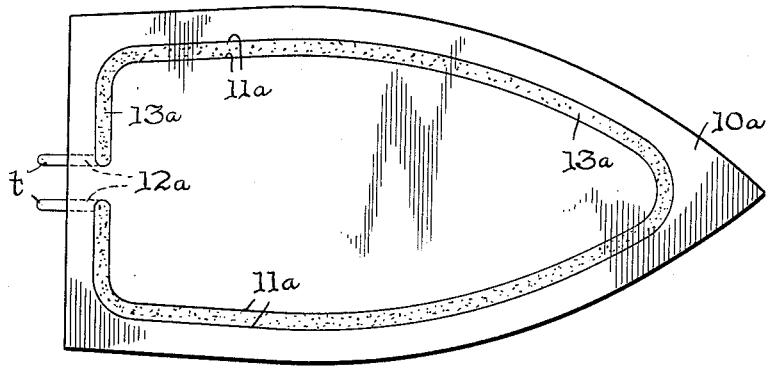
FIGURE 4 is a top plan view of a sadiron body member incorporating the present invention.

The present invention is susceptible of being embodied for many other uses. An example of one such other use is illustrated in FIGURE 4 in connection with a sadiron heating body 10ᵃ having its top or upper surface grooved, as at 11ᵃ and, as previously described, containing a heating element 12ᵃ maintained in position in the groove by a filler material 13ᵃ that may be melted, as aforesaid, when it is desired to replace the heating element in the iron.

Figure 5:
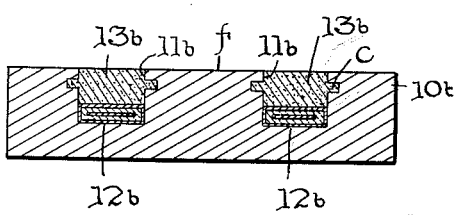
FIGURE 5 is a transverse sectional view through a metallic body member formed with grooves of a modified cross-sectional shape and illustrating a heating element incorporated therein in accordance with the present invention.

In FIGURE 5 a metallic heater body 10ᵇ is shown having a ribbon type heater element 12ᵇ provided in a groove 11ᵇ therein, the groove having lateral undercut channels *c* in and coextensive with its side walls to assure the retention of the filler metal or material 13ᵇ in said groove.

Figure 6:
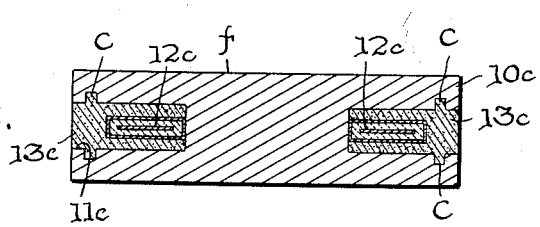
FIGURE 6 is a view similar to FIGURE 5 showing the grooves of similar cross sectional configuration formed in the perimetrical faces of a metallic body member and having a heating element incorporated therein.

In FIGURE 6, a further modification is shown wherein the groove 11ᶜ, similar to groove 11ᵇ in FIGURE 5, is made in the perimetrical surface of a heater body 10ᶜ and contains a heating element 12ᶜ of the ribbon type held in place in said groove by the filler material 13ᶜ.

Figure 7:
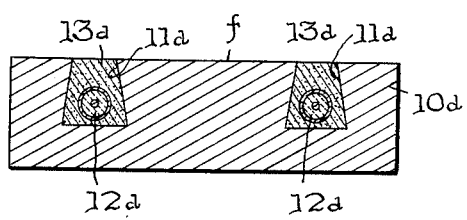
FIGURE 7 shows a view similar to FIGURES 5 and 6 and illustrating a still further modification of the heating element retaining groove in accordance with the present invention.

In FIGURE 7, another modification is shown of the groove 11 shown in FIGURES 2 and 3. The groove 11ᵈ in this modification has its side walls converge toward the surface *f* of the heater body 10 forming a "dove-tail" groove to insure the retention of the filler material 13ᵈ in said groove. The heating-element 12ᵈ may be of the, so-called, tubular type as shown or of the ribbon type.

In FIGURES 5, 6 and 7, the filler-material 13ᵇ, 13ᶜ and 13ᵈ thereof, respectively, have the same characteristics as previously described in connection with FIGURES 1, 2, 3 and 4.

From the above it will be observed that the objects of the present invention have been attained by the construction above set forth and that it has many advantages over present practices.

Having thus described the invention and the manner in which the same is to be performed, it is to be understood that the invention is not to be limited to the precise and exact steps and details of construction described and shown as they are susceptible of change or variation which fall within the spirit of the invention and the scope of the appended claims.

That which is claimed, as new and to be secured by Letters Patent, is:

1. In a metal heater-body member, said member including a unitary solid body having a functional surface for emitting heat to perform work, a channel formed in another surface of said body and extending about the area of said member and including at least one undercut wall portion, an electrically insulated heating element disposed in and along said channel and having a metal shield surrounding the same, said channel being of a depth to receive said heating element and to provide a space between the heating element disposed therein and its open side, and a metal fillet filling said channel and which has been solidified therein embedding said heating element therein and having a bonding contact with said element and the walls of said channel, said fillet having a melting point above the operating tempertaures of the body member, said body member being a rubber tire molding matrix having a tread forming inner surface, and said channel being annular and formed in an outer side face thereof and having its bottom adjacent the inner tread forming surface thereof.

2. In a metal heater-body member, said member including a unitary solid foundry aluminum body having a functional surface for emitting heat to perform work, a channel formed in another surface of said body and including at least one undercut wall portion, an electrically insulated heating element disposed in and along said channel and a metal shield surrounding the same, said channel being of a depth to receive said heating element and to provide a space between the heating element disposed therein and its open side, and a cast aluminum metal fillet entirely filling said channel and which though applied while molten has been solidified in the channel embedding said heating element in said channel and having a mechanical bonding contact with said undercut wall portion and intimate heat conducting contact with said body and said heating element in said channel.

References Cited in the file of this patent

UNITED STATES PATENTS

| | | |
|---|---|---|
| 982,045 | Fish et al. | Jan. 17, 1911 |
| 1,767,062 | Glidden et al. | June 24, 1930 |
| 2,063,642 | Vanden Berg | Dec. 8, 1936 |
| 2,570,657 | Fannen | Oct. 9, 1951 |
| 2,652,622 | Charbonneau | Sept. 22, 1953 |
| 2,759,220 | Hawkinson | Aug. 21, 1956 |